US012598231B2

(12) United States Patent
Laverne et al.

(10) Patent No.: US 12,598,231 B2
(45) Date of Patent: Apr. 7, 2026

(54) MOBILE OFFLOADING FOR DISCONNECTED TERMINAL OPERATION

(71) Applicant: ARGO AI, LLC, Pittsburgh, PA (US)

(72) Inventors: Michel H.J. Laverne, Pittsburgh, PA (US); Sean Williams, Pittsburgh, PA (US); Matthew Puchalski, Pittsburgh, PA (US)

(73) Assignee: VOLKSWAGEN GROUP OF AMERICA INVESTMENTS, LLC, Reston, VA (US)

( * ) Notice: Subject to any disclaimer, the term of this patent is extended or adjusted under 35 U.S.C. 154(b) by 303 days.

(21) Appl. No.: 17/991,675

(22) Filed: Nov. 21, 2022

(65) Prior Publication Data

US 2024/0171633 A1 May 23, 2024

(51) Int. Cl.
| | |
|---|---|
| *H04L 67/00* | (2022.01) |
| *H04L 67/1097* | (2022.01) |
| *H04W 4/02* | (2018.01) |
| *H04W 4/44* | (2018.01) |

(52) U.S. Cl.
CPC ......... *H04L 67/1097* (2013.01); *H04W 4/023* (2013.01); *H04W 4/44* (2018.02)

(58) Field of Classification Search
CPC ...... H04L 67/1097; H04W 4/44; H04W 4/023
See application file for complete search history.

(56) References Cited

U.S. PATENT DOCUMENTS

| | | | |
|---|---|---|---|
| 10,187,751 B2 | 1/2019 | Coutinho et al. | |
| 11,511,640 B1 | 11/2022 | Laskar et al. | |
| 12,200,568 B1 | 1/2025 | Byrne | |
| 2018/0300964 A1* | 10/2018 | Lakshamanan | ....... G06F 9/5027 |
| 2021/0114615 A1 | 4/2021 | Buerkle et al. | |
| 2021/0114616 A1 | 4/2021 | Altman | |

(Continued)

FOREIGN PATENT DOCUMENTS

| | | |
|---|---|---|
| CN | 108023946 | 5/2018 |
| CN | 110519345 | 11/2019 |

OTHER PUBLICATIONS

Zhang, Q. et al., "OpenVDAP: An Open Vehicular Data Analytics Platform for CAVs", 38th Int'l Conf. on Distributed Computing Systems (ICDCS), Jul. 2018, pp. 1310-1320.

(Continued)

*Primary Examiner* — Erika A Washington
(74) *Attorney, Agent, or Firm* — Sterne Kessler Goldstein & Fox P.L.L.C.

(57) ABSTRACT

Disclosed herein are system, method, and computer program product embodiments for a mobile offload station for disconnected terminal operation. For example, the method includes deploying at least one autonomous vehicle (AV) to within a predetermined proximity of a mobile offload station responsive to log data stored on a data storage device onboard the AV exceeding a data storage threshold. The method further includes establishing, by the at least one AV, a data communication link with the mobile offload station responsive to entry into the predetermined proximity. The method further includes transmitting, by the at least one AV, to a storage device onboard the mobile offload station, at least a portion of the log data via the data communication link.

20 Claims, 8 Drawing Sheets

300

(56) References Cited

U.S. PATENT DOCUMENTS

| | | | |
|---|---|---|---|
| 2021/0390848 A1 | 12/2021 | Ogawa | |
| 2022/0132284 A1 | 4/2022 | Tu et al. | |
| 2022/0139209 A1 | 5/2022 | Biala et al. | |
| 2023/0096556 A1* | 3/2023 | Lerner | H04W 84/18 |
| | | | 455/456.1 |
| 2023/0192142 A1 | 6/2023 | Wang et al. | |
| 2023/0195106 A1 | 6/2023 | Siegler et al. | |
| 2024/0166221 A1* | 5/2024 | Laverne | B60W 50/045 |

OTHER PUBLICATIONS

Yoo, A. et al., "Implementation of a Sensor Big Data Processing System for Autonomous Vehicles in the C-ITS Environment", Appl. Sci., Nov. 5, 2020, 16 pages.

* cited by examiner

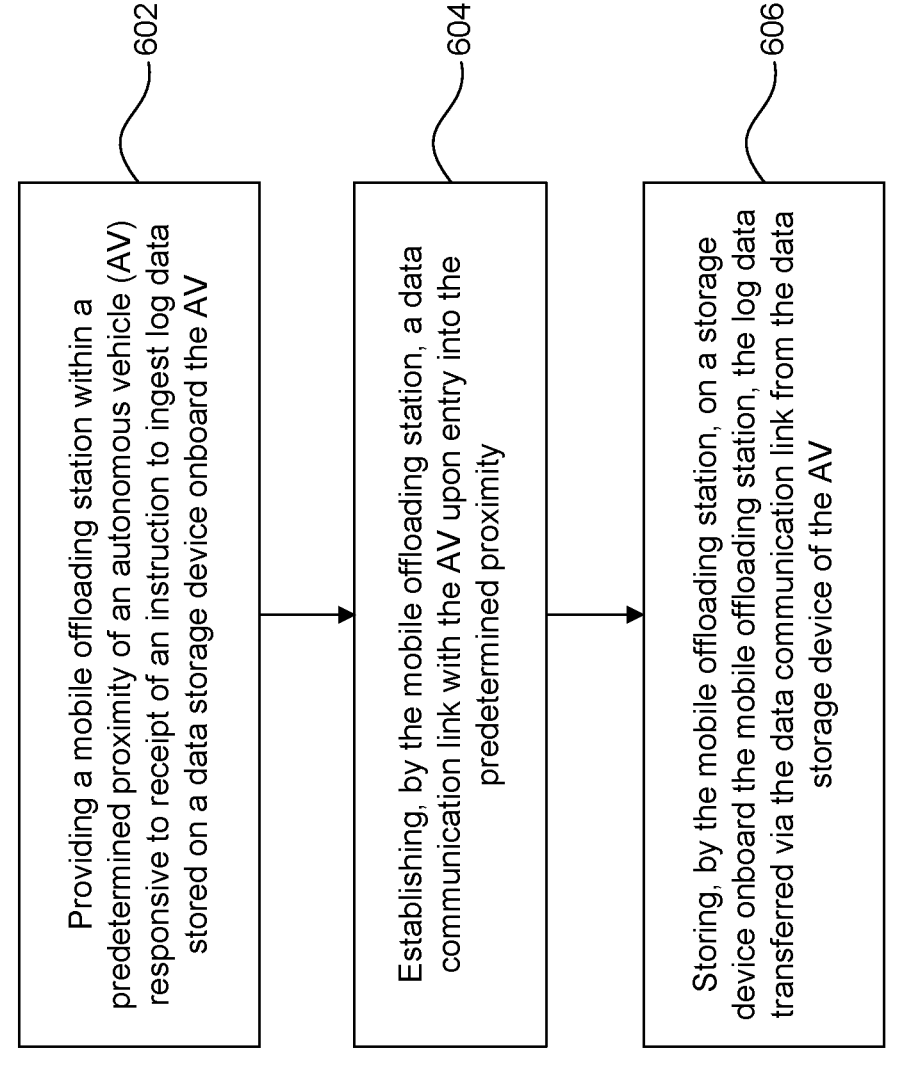

Providing a mobile offloading station within a predetermined proximity of an autonomous vehicle (AV) responsive to receipt of an instruction to ingest log data stored on a data storage device onboard the AV — 602

Establishing, by the mobile offloading station, a data communication link with the AV upon entry into the predetermined proximity — 604

Storing, by the mobile offloading station, on a storage device onboard the mobile offloading station, the log data transferred via the data communication link from the data storage device of the AV — 606

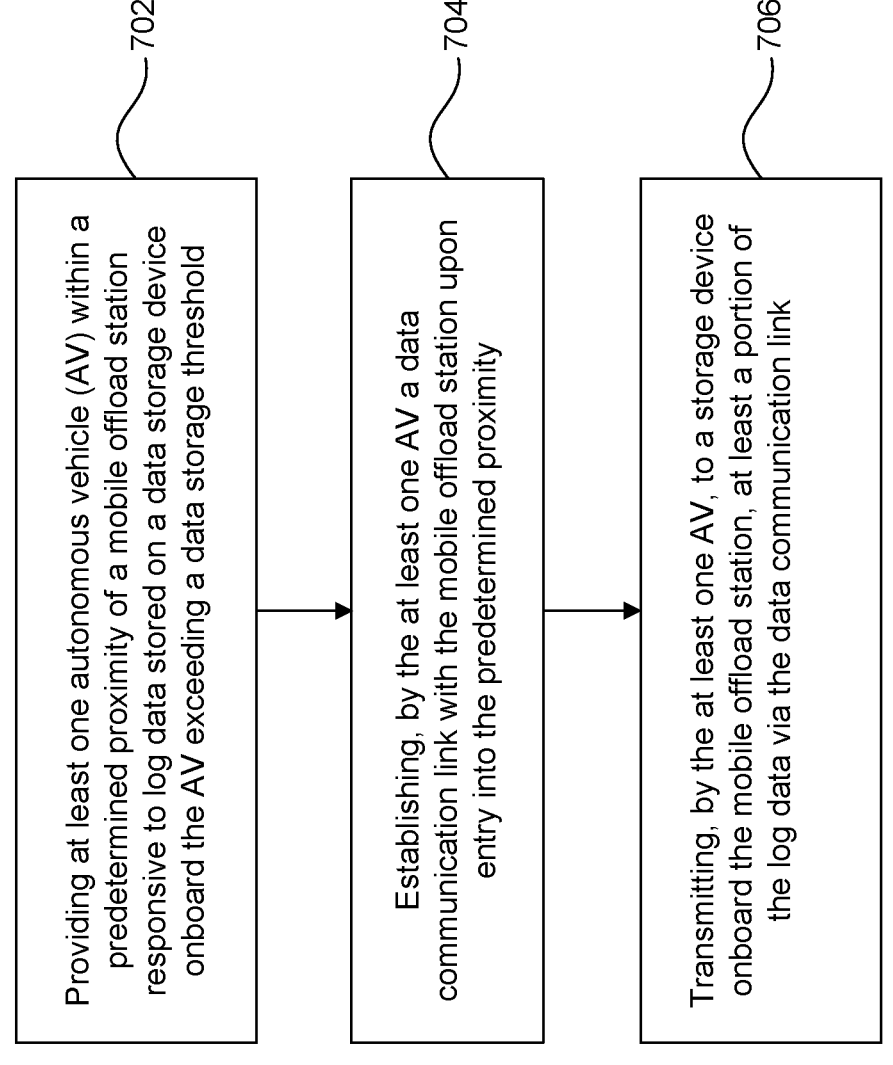

Providing at least one autonomous vehicle (AV) within a predetermined proximity of a mobile offload station responsive to log data stored on a data storage device onboard the AV exceeding a data storage threshold — 702

Establishing, by the at least one AV a data communication link with the mobile offload station upon entry into the predetermined proximity — 704

Transmitting, by the at least one AV, to a storage device onboard the mobile offload station, at least a portion of the log data via the data communication link — 706

MOBILE OFFLOADING FOR DISCONNECTED TERMINAL OPERATION

BACKGROUND

Autonomous vehicles (AVs) are often equipped with high-resolution cameras, light detecting and ranging (lidar), radio detection and ranging (RADAR), ultrasound, global positioning system (GPS), and a multitude of other sensors, to detect information about the environment in which they operate. The real-world log data generated by the cameras and the sensors can be used to train and improve autonomous driving algorithms. Hence, collecting and storing the log data is extremely valuable. However, the high-resolution cameras and the multitude of sensors on each AV may generate hundreds of gigabits of data for every hour of operation. Consequently, collecting and storing the massive amounts of raw log data generated by fleets of AVs has become a challenge for AV fleet operators.

SUMMARY

Some aspects of this disclosure relate to a method for offloading data from AVs using a mobile offload station. The method comprises deploying an autonomous vehicle (AV) to within a predetermined proximity of a mobile offload station responsive to log data stored on a data storage device onboard the AV exceeding a data storage threshold. The method further comprises establishing, by the AV, a data communication link with the mobile offload station responsive to entry into the predetermined proximity. Thereafter, the AV transmits the log data to a storage device onboard the mobile offload station, at least a portion of the log data via the data communication link.

Some aspects of this disclosure relate to an autonomous vehicle (AV) that has a memory and one or more processors that are coupled to the memory and configured to deploy the AV to within a predetermined proximity of a mobile offload station responsive to log data stored on a data storage device onboard the AV exceeding a data storage threshold. The one or more processors are further configured to establish a data communication link with the mobile offload station responsive to entry into the predetermined proximity. The one or more processors are further configured to transmit to a storage device onboard the mobile offload station, at least a portion of the log data via the data communication link.

Some aspects of this disclosure relate to a non-transitory computer-readable medium storing instruction that, when executed by a processor of an automated vehicle (AV), causes the processor to perform operations, including deploying the AV to within a predetermined proximity of a mobile offload station responsive to log data stored on a data storage device onboard the AV exceeding a data storage threshold. The operations further include establishing, by the AV, a data communication link with the mobile offload station responsive to entry into the predetermined proximity. The operations further include transmit, by the AV, to a storage device onboard the mobile offload station, at least a portion of the log data via the data communication link.

BRIEF DESCRIPTION OF THE DRAWINGS

The accompanying drawings are incorporated herein and form a part of the specification.

FIG. 6 illustrates an exemplary method for offloading log data from an AV using mobile offload station, in accordance with aspects of the disclosure.

FIG. 7 illustrates exemplary operations performed by an autonomous vehicle (AV), in accordance with aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
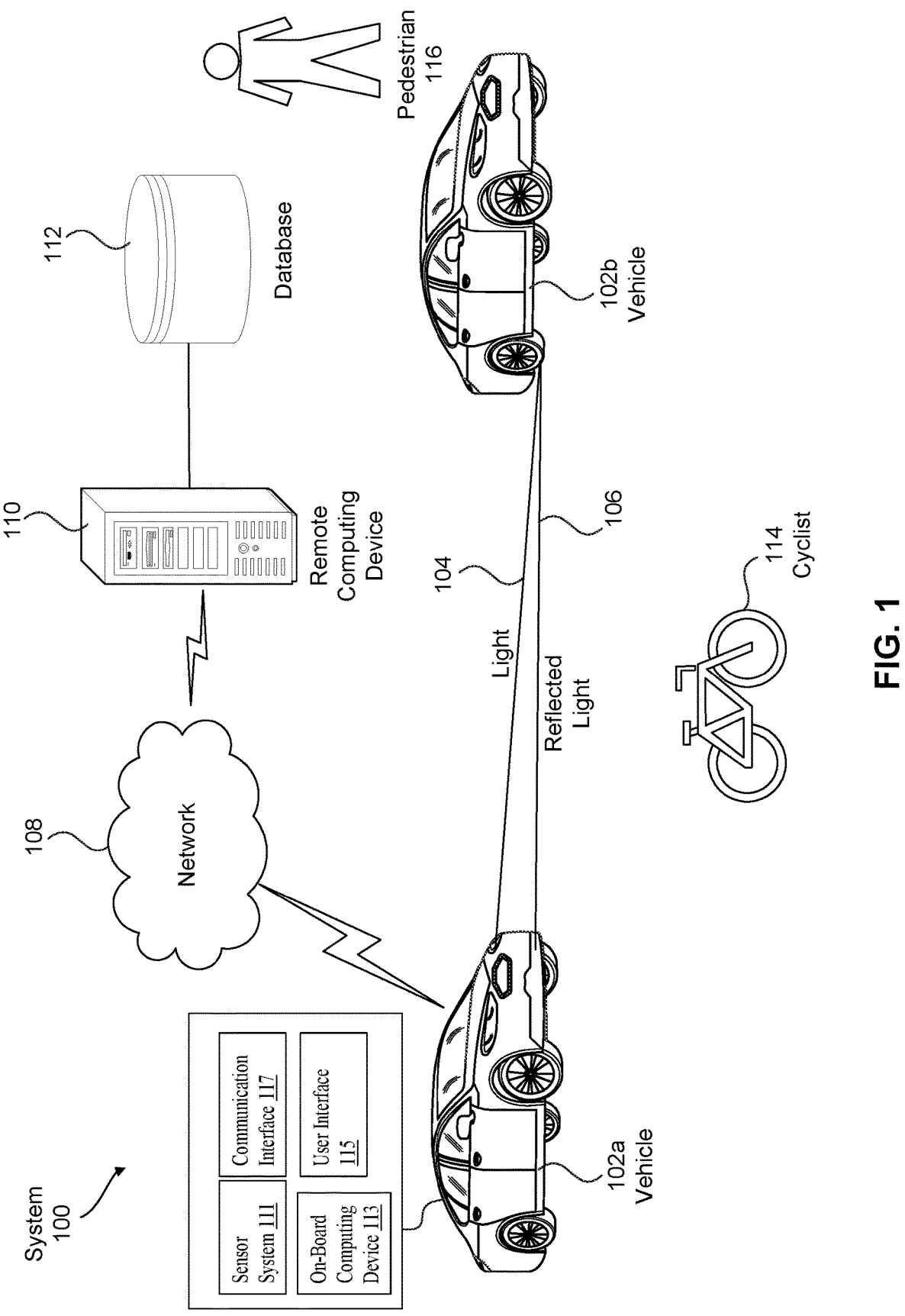
FIG. 1 illustrates an exemplary autonomous vehicle system, in accordance with aspects of the disclosure.

Provided herein are system, apparatus, device, method and/or computer program product embodiments, and/or combinations and sub-combinations thereof, for mobile offload station for disconnected terminal operation.

Autonomous vehicles use a variety of sensors and devices to gather, recognize and interpret the information surrounding their environment. An AV is typically equipped with several high-resolution visible spectrum cameras and infrared cameras, and sensors that include long-range and short-range lidar, RADAR, ultrasonic sensors, vehicle motion sensors, GPS sensors, and inertial measurement units (IMUs).

The data generated by the multitude of sensors provide valuable training data to train machine learning and deep learning algorithms that are deployed in AVs. The collected data can be used to train algorithms that allow AVs to identify and classify objects, such as other vehicles, pedestrians, road signs, and various other objects that are typically encountered on the road. In addition, the data can be used to train algorithms that can identify various dynamic objects around the AV, track the objects, and predict their next move. The data may also be used to identify specific circumstances that led to incorrect or inefficient behaviors by the AV.

According to some aspects, each AV is equipped with an on-board computing device that collects and stores the generated log data on an onboard storage system. However, the volume of log data generated by the cameras and sensors is massive, and hence an AV's on-board storage system may run out of available storage space fairly quickly. As an example, on an exemplary system a single camera generates approximately 20-60 megabits per second (MB/s), radar generates 10 KB/s, lidar generates 10-70 MB/s, and GPS generates approximately 50 KB/s. Hence, each AV may generate about 500 GB of data per hour and each terabyte of onboard storage space only provides two hours of operational time. Even with improved storage devices having many terabytes or more of storage capacity, improved sensors and sensor arrays may use the additional capacity in capturing higher resolution or higher refresh rate data.

According to some aspects, the issue of an AV's finite onboard storage system running out of space may be addressed by limiting the operational range of the AV. Under this approach, an AV is configured to return to an operations center to offload log data to a central server before its onboard storage runs out of space. As long as an AV is operating within a nominal range of operation, it can return to an operations center without losing any of the collected log data. AVs operating outside the nominal operating range of an operations center may lose valuable log data when their onboard storage runs out of space. Therefore, under this approach, an AV is bound to an operating area around an operation center. In addition, under this approach, the operational range of the AV is undesirably constrained by the size of the AV's onboard storage system.

To solve the above technological problems, embodiments herein provide a mobile offload station configured to travel to a location of an AV operating outside a nominal range of operation and perform a data ingest. The mobile offload station is further configured to return to an operations center and offload the log data ingested from the AV onto a central server. The ability to offload log data onto a mobile offload station enables the AVs to expand their operational range since they are no longer bound to an operating area around an operations center.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, a user interface 115, and an on-board storage system 119. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
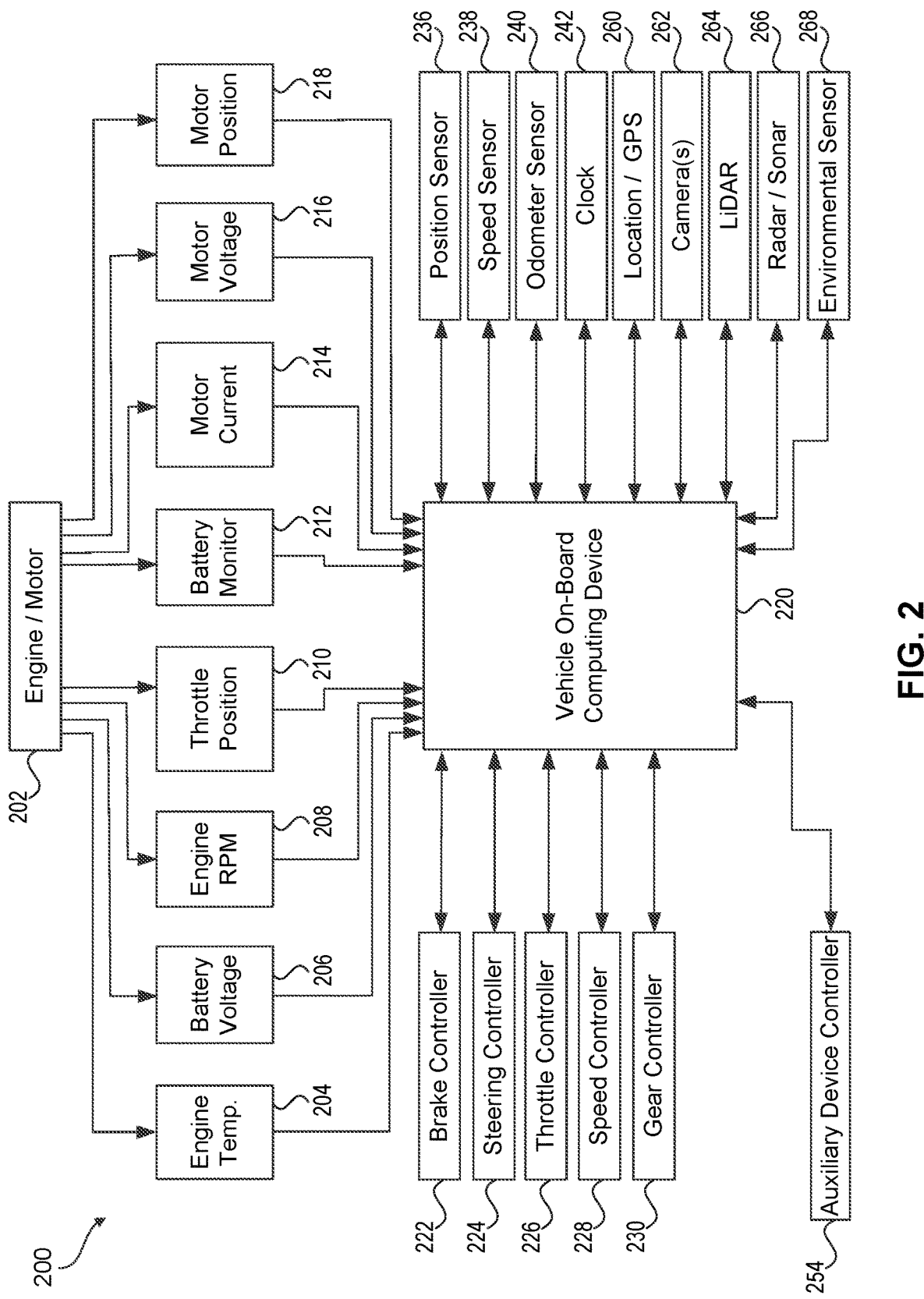
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a RADAR system, a laser detection and ranging (LADAR) system, a sound navigation and ranging (SONAR) system, one or more cameras (e.g., visible spectrum cameras, infrared cameras, etc.), temperature sensors, position sensors (e.g., GPS, etc.), location sensors, fuel sensors, motion sensors (e.g., IMU, etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112. The log data generated by the sensor system 111 is stored on-on an on-board storage system.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102*a* including, for example, a keyboard, a touch screen display device, a microphone, and a speaker, etc.

FIG. 2 illustrates an exemplary system architecture 200 for a vehicle, in accordance with aspects of the disclosure. Vehicles 102*a* and/or 102*b* of FIG. 1 can have the same or similar system architecture as that shown in FIG. 2. Thus, the following discussion of system architecture 200 is sufficient for understanding vehicle(s) 102*a*, 102*b* of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 5. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
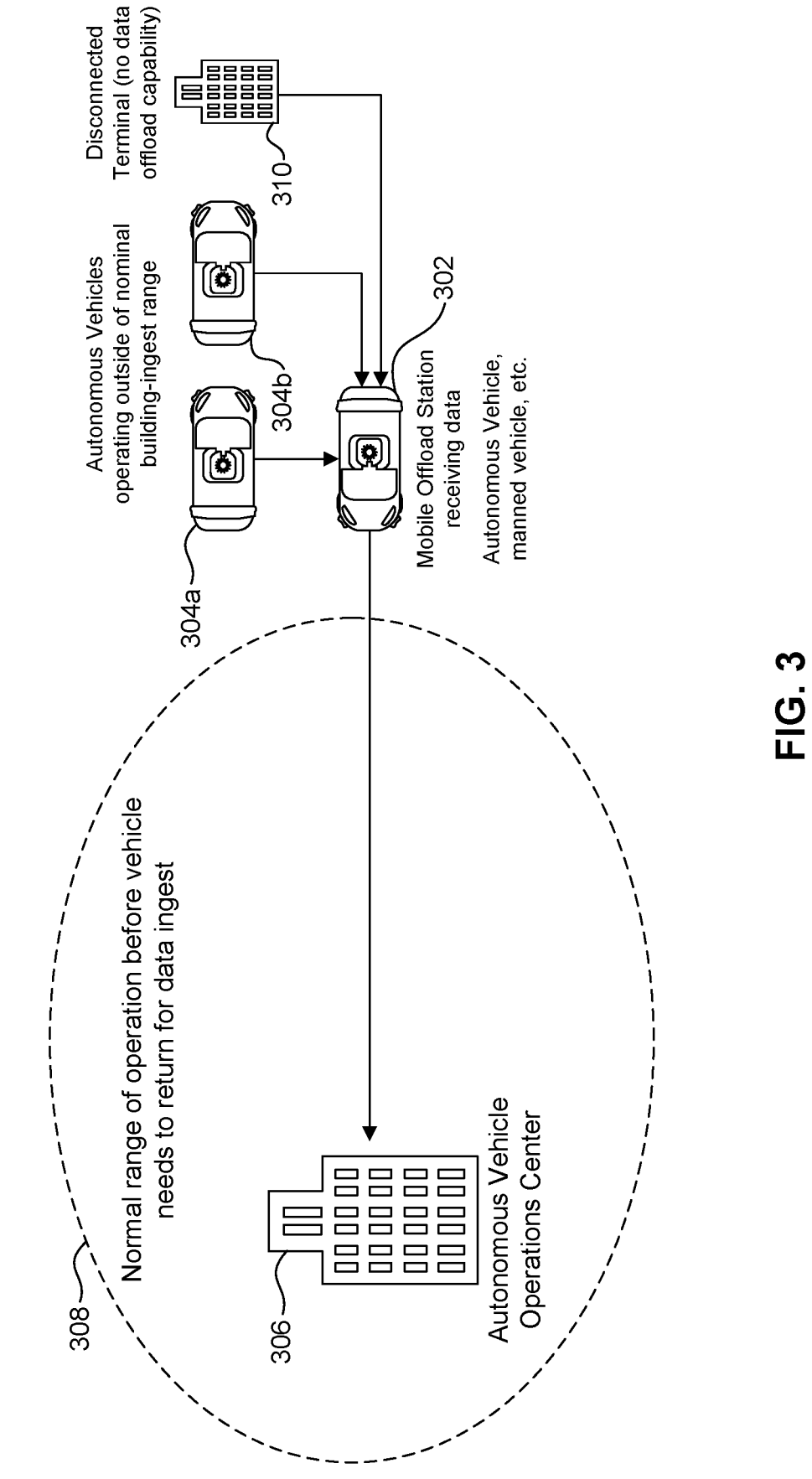
FIG. 3 illustrates an exemplary log data offloading system, in accordance with aspects of the disclosure.

FIG. 3 illustrates an exemplary log data offloading system 300, according to some aspects of this disclosure. System 300 comprises a mobile offload station 302, AVs 304a and 304b, and an autonomous vehicle operation center 306.

As discussed above, each AV, such as AVs 304a and 304b, is equipped with a sensor system 111 that comprises a multitude of sensors to detect information about the environment in which they operate. Sensor system 111 comprises high-resolution cameras and various sensors that include lidar, RADAR, ultrasonic sensors, vehicle motion sensors, GPS sensors, and inertial measurement units (IMUs). According to some aspects, each AV is also equipped with an on-board storage system 119. The on-board storage system 119 may include multiple M.2 non-volatile memory express (NVMe) solid-state drives (SSDs), U.2 NVMe SSDs, regular serial advance technology attachment (SATA) SSDs, and/or hard disk drives (HDDs). According to some aspects, AVs 304a and 304b collect and store the log data, which is time-stamped raw data generated by the cameras and sensors of sensor system 111, on the on-board storage system 119.

According to some aspects, an operational range of an AV around an operations center may correspond to the farthest distance from which an operational AV can return to the operations center before its onboard memory starts to overflow. Accordingly, AVs operating within a nominal range of operation 308 can return to operations center 306 to offload log data onto an offload server before their onboard storage runs out of space. According to some aspects, an AV's nominal range of operation may decrease in proportion to the operational time of the AV and/or the distance traveled by the AV. Hence, when possible, an AV returns to an operations center 306 before its nominal range of operation is reduced to zero. According to some aspects, the nominal range of operation of an AV may depend on the available amount of storage space in the onboard memory. In addition, the nominal range of operation of an AV may depend on the current location of the AV, available roads between the AV and the operations center, the traffic conditions, and the remaining battery level of the AV.

According to some aspects, when an AV operating within a nominal range of operation 308 returns to the operations center 306, a high-speed physical connection is established between the onboard storage system 119 of an AV and the offload server at the operations center 306 to offload log data. The physical connection between the AV and the offload server may be a high-speed Ethernet connection (e.g., 10GBASE-X, 40GBASE-X, 100GBASE-X). According to some aspects, log data ingested from each AV includes an identifier of the AV and information corresponding to the type of traffic and/or a category of driving environment corresponding to the log data. According to some aspects, log data ingested from multiple AVs is processed and aggregated by the operations center 306. According to some aspects, the log data ingested from multiple AVs may be offloaded by the operations center 306 to a cloud infrastructure for further analytics. According to some aspects, the processed log data is used to train machine learning or deep learning models for autonomous driving.

According to some aspects, AVs 304a and 304b may operate outside the nominal operating range corresponding to operations center 306. Since AVs 304a and 304b are operating outside the nominal operational range, their onboard storage may run out of storage space before they return to the operations center 306. To prevent a loss of log data due to a lack of storage space, the operations center 306 may instruct a mobile offload station 302 to travel to the location of AV 304a and/or AV 304b and perform a data ingest from the AVs, according to some aspects. According to some aspects, the operations center 306 may instruct a mobile offload station 302 to approach AV 304a and/or AV 304b within a predefined proximity. According to some aspects, AVs 304a and 304b, at times, may operate outside the nominal operation range corresponding to the operations center 306, and at times they may operate inside the nominal operation range corresponding to the operations center 306. According to some aspects, the mobile offload station 302 may perform a data ingest from an AV when it is operating outside its nominal operating range. In addition, according to some aspects, to expand the operational range of an AV, the mobile offload station 320 may also perform a data ingest when the AV is operating inside its nominal operational range. According to some aspects, when a physical terminal (e.g., 310) gets disconnected from a network, it may not have data offloading capability. According to some aspects, mobile offload station 302 may travel to the location of the disconnected terminal 310 to perform data ingest. According to some aspects, the mobile offload station 302 is manually operated. According to some aspects, the mobile offload station 302 is deployed as an AV and can travel to a specified location autonomously.

According to some aspects, the mobile offload station 302 is equipped with a high-capacity onboard storage system. The onboard storage system of the mobile offload station 302 may include multiple M.2 non-volatile memory express (NVMe) solid-state drives (SSDs), U.2 NVMe SSDs, regular serial advance technology attachment (SATA) SSDs, and/or hard disk drives (HDDs). Furthermore, the storage capacity of the mobile offload station's onboard storage system may be several orders of magnitude greater than the capacity of an AV's onboard storage system. Accordingly, the mobile offload station 302 may have sufficient storage capacity to ingest log data from multiple AVs.

According to some aspects, status parameters corresponding to various AVs operating outside their nominal range of operation are remotely monitored by the operations center 306. The monitored status parameters of an AV may include available storage space on the on-board storage system, remaining battery level, and location coordinates. According to some aspects, the operation center 306 also monitors status parameters corresponding to one or more mobile offload stations. According to some aspects, the operations center 306 may only monitor mobile offload stations that are within range for remote wireless monitoring.

According to some aspects, the operations center 306 monitors the available storage space on the onboard storage system of AVs 304a and 304b. When the available storage space on the onboard storage system of an AV falls below a threshold, the operations center 306 may trigger a data ingest instruction to a mobile offload center 302. According to some aspects, when log data stored on the onboard storage system of an AV exceeds a data storage threshold, the operations center 306 may trigger a data ingest instruction to a mobile offload center 302. The instruction sent to the mobile offload station 302 may include information corresponding to the current location coordinates of the AV that triggered the data ingest instruction, as well as information corresponding to the amount of data that has to be offloaded from the AV onto the mobile offload station 302. Upon receiving a data ingest instruction from the operations center 306, the mobile offload station 302 may travel to the location of the AV and perform a data ingest. Alternatively, the operations center 306 may send instructions to both the AV and the mobile offload station 302 to meet at a common location for performing data ingest from the AV. According to some aspects, the mobile offload station may travel along the AV and perform a data ingest wirelessly while the AV is in motion.

According to some aspects, when the available storage onboard multiple AVs falls below a threshold, the operations center 306 may determine a suitable common meeting location based on the current locations of the multiple AVs. Thereafter, the operations center 306 may then send an instruction to the mobile offload station 302 and the multiple AVs to travel to the determined meeting location for performing data offload from the AVs onto the mobile offload station 302. According to some aspects, the operations center 306 may send instructions to the mobile offload station 302 and a convoy of AVs to cluster within predetermined proximity for performing data offload from the AVs onto the mobile offload station 302.

According to some aspects, the mobile offload station 306 may remotely monitor the available storage space on the onboard storage system of AVs 304a and 304b. When the available storage space on the onboard storage system of an AV falls below a threshold, the mobile offload station 302 may trigger a data offload instruction to the AV. According to some aspects, log data stored on the onboard storage system of an AV exceeds a data storage threshold, the mobile offload station 302 may trigger a data offload instruction to the AV. The mobile offload station 302 may send instructions to the AV to meet at a common location for performing data ingest from the AV.

According to some aspects, the threshold value used to trigger a data ingest instruction may be determined based on the level of significance of the log data that is to be offloaded from an AV. For example, when the log data stored at an AV is of high value (i.e., higher level of significance), a higher threshold value (e.g., 25%) is associated with the AV. Accordingly, when the remaining amount of storage space at the AV with high-value data falls below the threshold value (e.g., falls below 25% of the total storage space), a data ingest instruction may be triggered by the operation center. Alternatively, when the log data stored at an AV is of low-value (i.e., lower level of significance), a lower threshold value (e.g., 10%) is associated with the AV. Accordingly, when the remaining amount of storage space at the AV collecting low-value data falls below the threshold value (e.g., falls below 10%), a data ingest instruction is triggered by the operation center. Under this approach, an AV with a higher significance log data is less likely to run out of storage space and lose data as a result. According to some aspects, the value assigned to data may depend on the AV's operating environment. According to some aspects, the operations center may assign a value to the collected data collected by an AV based on the route traveled by the AV. As an example, data corresponding to intra-city routes with high pedestrian traffic may be assigned a higher value over freeway routes with low pedestrian traffic.

According to some aspects, when an AV and the mobile offload station 302 meet at a common location, a high-speed physical connection may be established between on-board storage system 119 of the AV and the mobile offload station 302. According to some aspects, when an AV and the mobile offload station 302 are within a predetermined proximity, a high-speed physical connection may be established between on-board storage system 119 of the AV and the mobile offload station 302. The physical connection between the AV and the mobile offload station 302 may be a high-speed Ethernet connection (e.g., 1000BASE-X, 10GBASE-X, 40GBASE-X, 100GBASE-X). Alternatively, a high-speed wireless connection may be established between an AV and the mobile offload station 302. The wireless connection may be a point-to-point high-speed wireless local area network connection (WLAN) (e.g., 802.11n, 802.11ac, 802.11ad).

According to some aspects, when multiple AVs meet at a common location, multiple parallel wired connections may be established between the AVs and a mobile offload station 302. According to some aspects, the mobile offload station may be equipped with multiple high-speed data transfer interfaces (e.g., Gigabit Ethernet ports) for performing parallel ingestion of data from the multiple AVs. Alternatively, a point-to-multipoint high-speed WLAN connection may be established between the mobile offload station and the AVs for parallel ingestion of data. According to some aspects, once the mobile offload station ingests log data from one or more AVs, it returns to the operations center 306 to offload the data onto a central offload server at the operations center. According to some aspects, the operations center may classify and process the log data and offload the processed data onto a cloud infrastructure for further analytics.

According to some aspects, the mobile offload station may be implemented as a jump server onboard an AV that is dedicated to the consumption of data from one or more other AVs and transporting the data to a server at the operations center. According to some aspects, the mobile offload station 302 while acting as a jump server may perform cryptographic operations (e.g., data encryption and cryptographic key exchanges between an AV and the mobile offload station 302 and between the operations center 306 and the mobile offload station 302).

Figure 4:
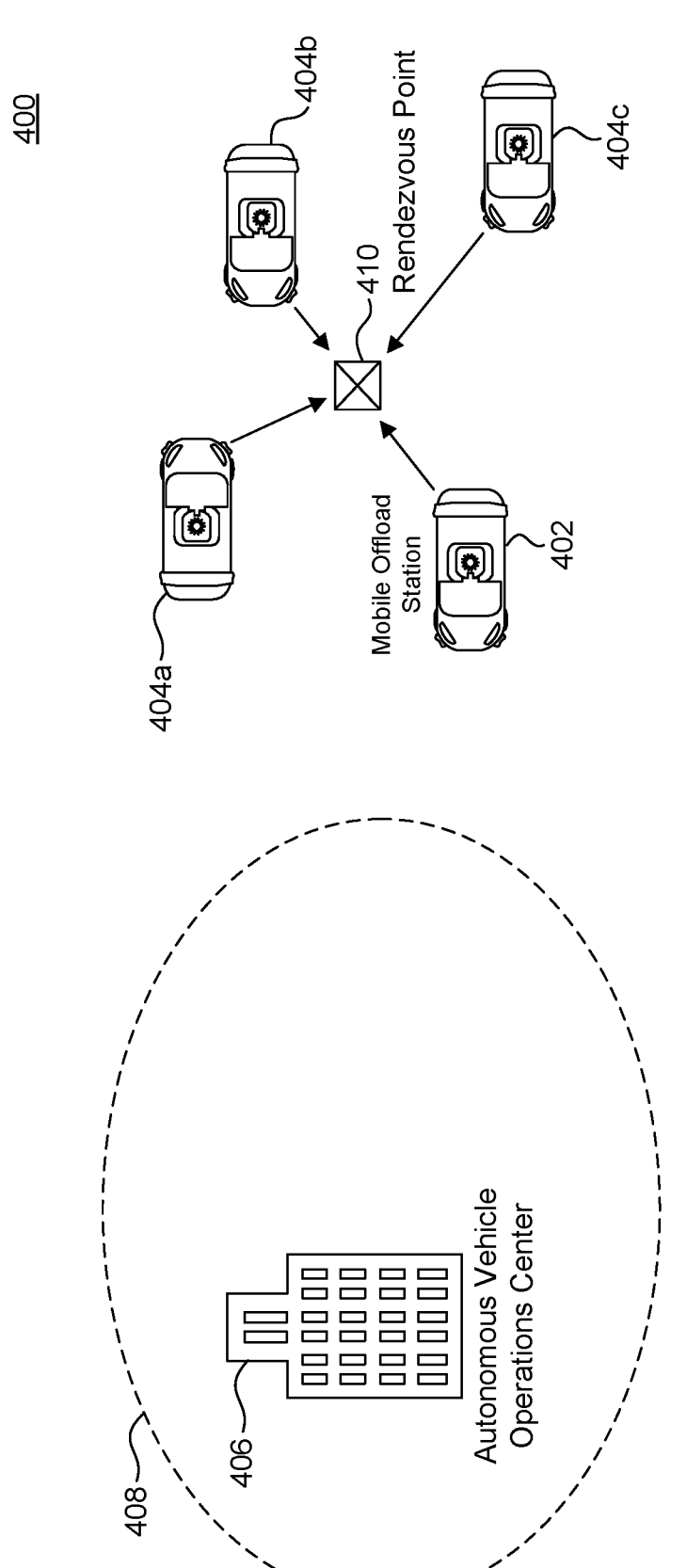
FIG. 4 illustrates an exemplary mobile offload station meeting multiple AVs at a common location point to perform log data ingest, according to some aspects.

FIG. 4 illustrates an example of a mobile offload station meeting one or more AVs at a common location point to perform log data ingest, according to some aspects. According to some aspects, the operations center 406 monitors the location and the available storage space on the onboard storage system of AVs that are operating outside their normal range of operation but within the operation center's monitoring range. As an example, the operations center 406 monitors the location and the available storage space on the onboard storage system of the AVs 404a, 404b, and 404c.

When the available storage space on the onboard storage system of AVs 404a, 404b, and 404c fall below a threshold, the operations center 406 may trigger a data ingest instruction to a mobile offload center 402. According to some aspects, when log data stored on the onboard storage system of AVs 404a, 404b, and 404c exceeds a threshold, the operations center 406 may trigger a data ingest instruction to a mobile offload center 402. According to some aspects, the instruction sent to the mobile offload station 402 may include identities of the AVs 404a, 404b, and 404c, and information corresponding to the location coordinates of a rendezvous point 410. The operations center 406 also transmits the location coordinates of the rendezvous point 410 to the AVs 404a, 404b, and 404c.

According to some aspects, the operations center 406 may determine a common meeting location (e.g., rendezvous point 410) such that the likelihood of the AVs losing their log data is minimized. Under this approach, the operations center 410 determines a rendezvous point that is located closest to the AV that has the least amount of storage space available. According to some aspects, the operations center 410 may determine the rendezvous point 410 such that a cumulative metric (e.g., weighted average) of the travel times of the AVs 404a, 404b, and 404c from their current locations to the rendezvous point 410 is minimized. According to some aspects, the operations center 410 may determine the rendezvous point 410 such that a cumulative metric (e.g., a weighted average) corresponding to the distance traveled by the AVs 404a, 404b, and 404c to reach the rendezvous point 410 from their current locations is minimized. Upon receiving information corresponding to the common location point (i.e., the rendezvous point) from the operations center 306, the mobile offload station 402 and the AVs 404a, 404b, and 404c may meet at the rendezvous point 410 and perform a data ingest.

According to some aspects, the AVs 404a, 404b, and 404c might be out of a communications range with the operations center 410. As a result, the operations center 410 may be unable to remotely monitor the AVs. In such a case, the mobile offload station 402 may remotely monitor the location and the available storage space on the onboard storage system of AVs that are operating outside the communications range of the operations center 410. When the available storage space on the onboard storage system of one or more AVs (e.g., AVs 404a, 404b, and 404c) falls below a threshold, the mobile offload station 402 may transmit a data offload instruction along with information corresponding to location coordinate of a rendezvous point 410.

According to some aspects, when the available storage space on the onboard storage system of an AV falls below a threshold, the AV itself may transmit a data offload request to the mobile offload station 402. The data offload request may include information corresponding to the identity of the AV and information corresponding location coordinates of the AV. According to some aspects, the mobile offload station 402 may receive data offload requests from one or more AVs (e.g., AVs 404a, 404b, and 404c). The mobile offload station 402 may thereafter determine a rendezvous point 410 and transmit the information corresponding to the location coordinate of the rendezvous point to the AVs 404a, 404b, and 404c.

According to some aspects, the mobile offload station 402 may determine the rendezvous point 410 such that a cumulative metric (e.g., weighted average) of the travel times of the AVs 404a, 404b, and 404c from their current locations to the rendezvous point 410 is minimized. According to some aspects, the mobile offload station 402 may determine the rendezvous point 410 such that a cumulative metric (e.g., a weighted average) corresponding to the distance traveled by the AVs 404a, 404b, and 404c to reach the rendezvous point 410 from their current locations is minimized. Upon receiving information corresponding to the common location point (i.e., the rendezvous point) from the mobile offload station, the AVs 404a, 404b, and 404c may meet with the mobile offload station 402 at the rendezvous point 410 and perform a data ingest. According to some aspects, data ingest is performed when the mobile offload station is within a predetermined proximity of an AV. According to some aspects, after performing data ingest from the AVs 404a, 404b, and 404c, the mobile offload station returns to the operations center 406 to offload the ingested data onto an offload server.

Figure 5:
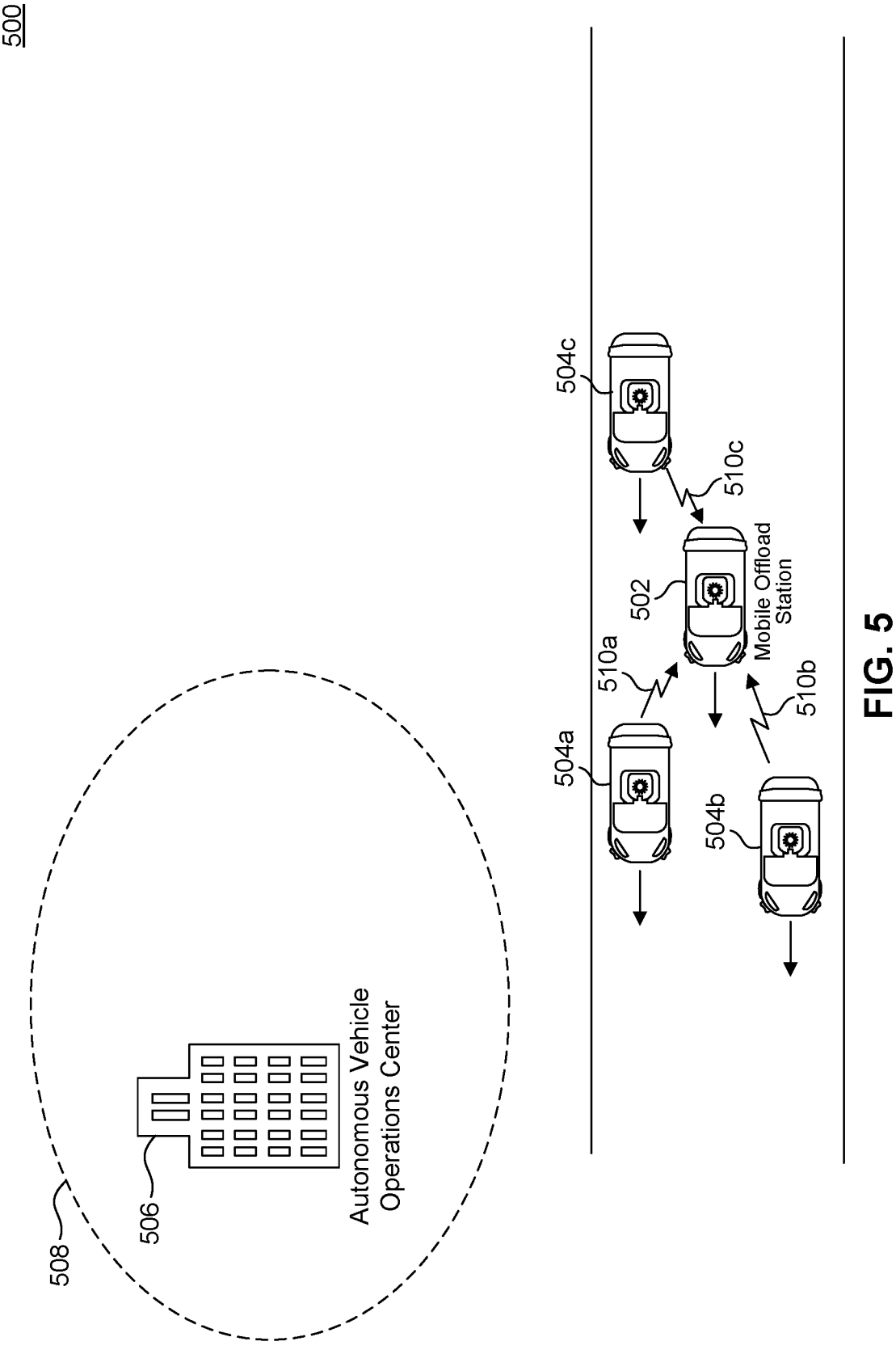
FIG. 5 illustrates an exemplary mobile offload station performing an in-transit log-data ingest from an AV, according to some aspects.

FIG. 5 illustrates an example of a mobile offload station performing an in-motion log-data ingest from one or more AVs, according to some aspects. According to some aspects, the mobile offload station 502 may intercept one or more AVs (e.g., AVs 504a, 504b, and 504c) and perform a wireless data ingest while the AVs are in transit. According to some aspects, a convoy of one or more AVs (e.g., AVs 504a, 504b, and 504c) may cluster within a predetermined proximity of the mobile offload station 502 and perform a wireless data ingest while the AVs are in transit. As an example, the mobile offload station 502 may perform an in-transit data ingest when finding a rendezvous point is not feasible. According to some aspects, the operations center 506 monitors the location, speed, direction of travel, and the available storage space on the onboard storage system of the AVs 504a, 504b, and 504c. When the available storage space on the onboard storage system of one or more AVs falls below a threshold, the operations center 506 may trigger a data ingest instruction to the mobile offload center 502. According to some aspects, the instruction sent to the mobile offload station 402 may include identities of the AVs 504a, 504b, and 504c, and information corresponding to their location, speed, and direction of travel. According to some aspects, the operations center may determine and provide path information for the mobile offload station 502. The mobile offload station 502 can use the path information to intercept one or more AVs and travel along with them to perform a data ingest wirelessly.

According to some aspects, when the AVs 504a, 504b, and 504c are out of a communications range with the operations center 510, the mobile offload station 502 may remotely monitor the location, speed, direction of travel, and the available storage space on the onboard storage system of the AVs 504a, 504b, and 504c. When the available storage space on the onboard storage system of one or more falls below a threshold, the mobile offload station 502 may transmit a data offload instruction to the one or more AVs. The offload instruction may include system information needed to securely establish a wireless connection with one or more AVs. The mobile offload station 502 thereafter calculates a path to intercept the AVs 504a, 504b, and 504c and perform a wireless data ingest once the AVs are within a predetermined proximity.

According to some aspects, when the available storage space on the onboard storage system of an AV falls below a threshold, the AV itself may transmit a data offload request to the mobile offload station 502. According to some aspects, when the log data stored on the onboard storage system of an AV exceeds a threshold, the AV may transmit a data offload request to the mobile offload station 502. The data offload request may include information corresponding to the identity of the AV, and its location, speed, and direction of travel. According to some aspects, the mobile offload station 502 may receive data offload requests from one or more AVs (e.g., AVs 504a, 504b, and 504c). The mobile offload station 402 may thereafter determine a path, using the information in the received data offload requests, to intercept the AVs 504a, 504b, and 504c and perform a wireless data ingest once the AVs are within a predetermined proximity. According to some aspects, the mobile offload station establishes wireless connections 510a, 510b, and 510c with AVs 504a, 504b, and 504c, respectively. The wireless connection may be a point-to-point high-speed wireless local area network connection (WLAN) (e.g., 802.11n, 802.11ac, 802.11ad). According to some aspects, after performing data ingest from the AVs 404a, 404b, and 404c, the mobile offload station returns to the operations center 506 to offload the ingested data onto an offload server.

FIG. 6 illustrates exemplary operations performed by a mobile offload station, according to some aspects of this disclosure. Method 600 can be performed by a mobile offload station as shown in FIGS. 1-5. For example, the functions of method 600 can be performed by vehicle on-board computing device 220 or caused to be performed by processor 804.

At 602, the mobile offload station is provided within a predetermined proximity of an AV responsive to receipt of an instruction to ingest log data stored on a data storage device onboard the AV. According to some aspects, the mobile offload station meets with an AV at a common location responsive to receipt of an instruction to ingest log data stored on a data storage device onboard the AV. According to some aspects, the AV may be operating outside a nominal operational range of an operations center 306, and the operations center monitors various status parameters corresponding to the AV, such as, for example, available storage space on the onboard storage system and location coordinates. According to some aspects, the instruction sent from the operations center contains information corresponding to the common location and information corresponding to the identity of the AV.

According to some aspects, the common location is determined such that it minimizes an average cumulative distance travelled by a plurality of AVs to reach the common location. According to some aspects, the common location is determined such that it minimizes an average cumulative travel time incurred by a plurality of AVs to reach the common location. According to some aspects, the instruction is generated by the operations center based on a determination that the amount of available space on the storage device onboard the AV is lower than a threshold value. Furthermore, the threshold value may be determined based on the level of significance of the log data.

According to some aspects, the mobile offload station may remotely monitor the available storage space on the onboard storage system of an AV. When the available storage space on the onboard storage system of the AV falls below a threshold, the mobile offload station may trigger a data offload instruction to the AV. The instruction sent by the offload station may include information corresponding a common location for meeting and performing data ingest. According to some aspects, when the available storage space on the onboard storage system of an AV falls below a threshold, the AV itself may transmit a data offload request to the mobile offload station 402. The data offload request may include information corresponding to the identity of the AV and information corresponding location coordinates of the AV.

At 604, the mobile offload station establishes a data communication link with the AV upon meeting with the AV at the common location. According to some aspects, the data communication link is a wired link or a point-to-point wireless link. According to some aspects, a high-speed physical connection is established between on-board storage system 119 of an AV and the central offload server at the operations center 306. The physical connection between the AV and the offload server may be a high-speed Ethernet connection (e.g., 10GBASE-X, 40GBASE-X, 100GBASE-X). Alternatively, a high speed wireless connection may be established between the AV and the mobile offload station 302. The wireless connection may be a point-to-point high-speed wireless local area network connection (WLAN) (e.g., 802.11n, 802.11ac, 802.11ad). According to some aspects, the mobile offload station may include a plurality of data transfer interfaces for parallel ingestion of log data from a plurality of AVs.

At 606, the mobile offload station, stores the log data transferred via the data communication link from the data storage device of the AV on a storage device on-board the mobile offload station. According to some aspects, the mobile offload station 302 is equipped with a high capacity on-board storage system 119. The on-board storage system 119 of the mobile offload station 302 may include multiple M.2 non-volatile memory express (NVMe) solid-state drives (SSDs), U.2 NVMe SSDs, regular serial advance technology attachment (SATA) SSDs, and/or hard disk drives (HDDs). According to some aspects, after ingesting data from one or more AVs, the mobile offload station 302 returns to an operations center and transfers the log data from the on-board storage system 119 onto a central server at the operations center for further processing.

FIG. 7 illustrates exemplary operations performed by an autonomous vehicle (AV), according to some aspects of this disclosure. Method 700 can be performed by an AV, as shown in FIGS. 1-5. For example, the functions of method 700 can be performed by vehicle on-board computing device 220 or caused to be performed by processor 804.

At 702, at least one AV is provided within a predetermined proximity of a mobile offload station responsive to log data stored on a data storage device onboard the AV exceeding a data storage threshold. According to some aspects, the AV may be operating outside a nominal operational range of an operations center 506, and the operations center monitors various status parameters corresponding to the AV, such as, for example, the location, speed, direction of travel, and the available storage space on the onboard storage system of the AV. According to some aspects, when the available storage space on the onboard storage system of one or more AVs falls below a threshold, the operations center 506 may trigger a data ingest instruction to the mobile offload center 502.

According to some aspects, an instruction sent from the operations center to one or more AVs may contain information corresponding to the location, speed, and direction of travel of the mobile offload station. According to some aspects, an instruction is generated by the operations center based on a determination that the amount of available space on the storage device onboard the AV is lower than a threshold value. Furthermore, the threshold value may be determined based on the level of significance of the log data.

According to some aspects, an AV may remotely monitor the location, speed, and direction of travel of a mobile offload station. According to some aspects, when the available storage space on the onboard storage system of an AV falls below a threshold, the AV itself may transmit a data offload request to the mobile offload station 402. The data offload request may include information corresponding to the identity of the AV and information corresponding location coordinates of the AV. According to some aspects, a convoy of one or more AVs may cluster within a predetermined proximity of the mobile offload station 502 and perform a wireless data ingest while the AVs are in motion.

At 704, the AV establishes a data communication link with the mobile offload station upon entry into the predetermined proximity. According to some aspects, the proximity value may be based on the speed of the mobile offload station. According to some aspects, the data communication link is a wired link or a point-to-point wireless link. According to some aspects, a high-speed physical connection is established between on-board storage system 119 of an AV and the central offload server at the operations center 306. According to some aspects, a high-speed wireless connection may be established between the AV and the mobile offload station 302. The wireless connection may be a point-to-point high-speed wireless local area network connection (WLAN) (e.g., 802.11n, 802.11ac, 802.11ad). According to some aspects, the mobile offload station may include a plurality of data transfer interfaces for parallel ingestion of log data from a plurality of AVs. According to some aspects, the rate of data transfer from an AV to the mobile offload station may depend on the number of AVs that are in parallel communication with the mobile offload station.

At 706, the AV transmits to a storage device onboard the mobile offload station at least a portion of the log data via the data communication link. According to some aspects, the amount of log data offloaded by an AV may depend on the available space on the on-board storage system 119 of the mobile offload station 302 and the number of AVs per. According to some aspects, the mobile offload station 302 is equipped with a high-capacity on-board storage system 119. The on-board storage system 119 of the mobile offload station 302 may include multiple M.2 non-volatile memory express (NVMe) solid-state drives (SSDs), U.2 NVMe SSDs, regular serial advance technology attachment (SATA) SSDs, and/or hard disk drives (HDDs). According to some aspects, after ingesting data from one or more AVs, the mobile offload station 302 returns to an operations center and transfers the log data from the on-board storage system 119 onto a central server at the operations center for further processing.

Figure 8:
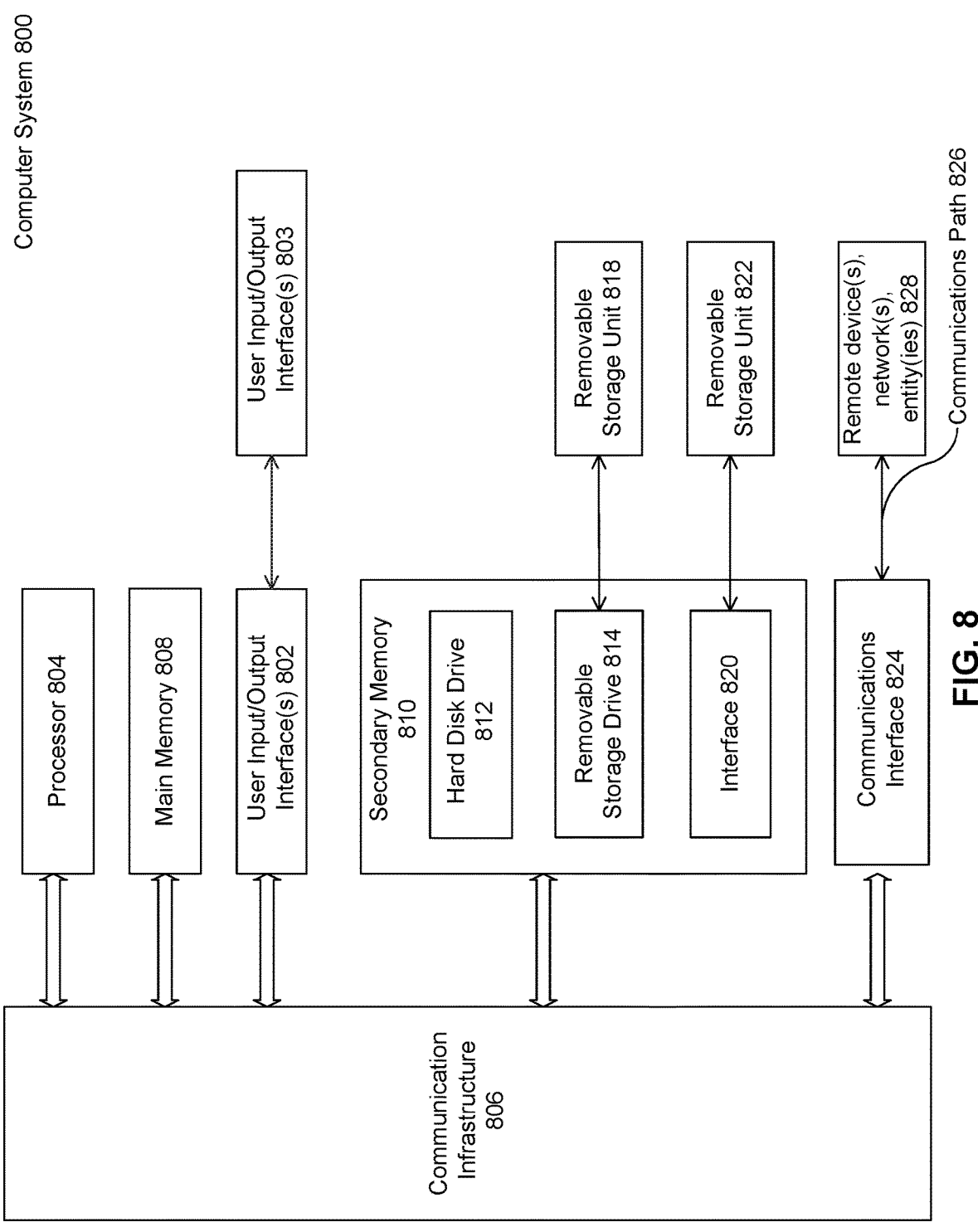
FIG. 8 is an example computer system useful for implementing various embodiments.

Various embodiments can be implemented, for example, using one or more computer systems, such as computer system 800 shown in FIG. 8. Computer system 800 can be any computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:

monitoring, by one or more computing devices, a status parameter corresponding to an autonomous vehicle (AV) to determine whether the AV is operating outside its nominal range of operation, and for the AV operating outside its nominal range of operation, a logged data on a data storage device onboard the AV to determine whether the data storage device has exceeded a data storage threshold;

deploying, by the one or more computing devices, a mobile offload station to a proximate distance of the AV based on detecting that the logged data has exceeded the data storage threshold;

instructing, by the one or more computing devices, the mobile offload station to ingest the logged data from the AV upon the mobile offload station entering the proximate distance to the AV; and receiving, by the one or more computing devices, the logged data from the mobile offload station after completion of ingestion of the logged data by the mobile offload station.

2. The computer-implemented method of claim 1, wherein the mobile offload station is a further AV.

3. The computer-implemented method of claim 1, wherein the mobile offload station is a non-autonomous vehicle.

4. The computer-implemented method of claim 1, further comprising determining, by the one or more computing devices, the data storage threshold based on a level of significance of the logged data.

5. The computer-implemented method of claim 1, further comprising deploying, by the one or more computing devices, the AV to the proximate distance of the mobile offload station upon detecting that the data storage device has exceeded the data storage threshold.

6. The computer-implemented method of claim 1, further comprising offloading, by the one or more computing devices, the logged data onto a cloud infrastructure for further processing upon receiving the logged data from the mobile offload station.

7. The computer-implemented method of claim 1, further comprising determining, by the one or more computing devices, the proximate distance based a rendezvous point chosen such that a cumulative metric of travel times of the AV and the mobile offload station are minimized.

8. A computing system, comprising:

a memory to store instructions; and at least one processor coupled to the memory and configured to process the stored instructions to perform operations comprising:

monitor a status parameter corresponding to an autonomous vehicle (AV) to determine whether the AV is operating outside its nominal range of operation, and for the AV operating outside its nominal range of operation, a logged data on a data storage device onboard the AV to determine whether the data storage device has exceeded a data storage threshold;

deploy a mobile offload station to a proximate distance of the AV based on detecting that the logged data has exceeded the data storage threshold;

instruct the mobile offload station to ingest the logged data from the AV upon the mobile offload station entering the proximate distance to the AV; and receive the logged data from the mobile offload station after completion of ingestion of the logged data by the mobile offload station.

9. The computing system of claim 8, wherein the mobile offload station is a further AV.

10. The computing system of claim 8, wherein the mobile offload station is a non-autonomous vehicle.

11. The computing system of claim 8, wherein the at least one processor is further configured to determine the data storage threshold based on a level of significance of the logged data.

12. The computing system of claim 8, wherein the at least one processor is further configured to deploy the AV to the proximate distance of the mobile offload station upon detecting that the data storage device has exceeded the data storage threshold.

13. The computing system of claim 8, wherein the at least one processor is further configured to offload the logged data onto a cloud infrastructure for further processing upon receiving the logged data from the mobile offload station.

14. The computing system of claim 8, wherein the at least one processor is further configured to determine the proximate distance based a rendezvous point chosen such that a cumulative metric of travel times of the AV and the mobile offload station are minimized.

15. A non-transitory computer-readable medium having instructions stored thereon that, when executed by at least one processor of a computing system, cause the at least one processor to perform operations comprising:

monitoring a status parameter corresponding to an autonomous vehicle (AV) to determine whether the AV is operating outside its nominal range of operation, and for the AV operating outside its nominal range of operation, a logged data on a data storage device onboard the AV to determine whether the data storage device has exceeded a data storage threshold;

deploying a mobile offload station to a proximate distance of the AV based on detecting that the logged data has exceeded the data storage threshold;

instructing the mobile offload station to ingest the logged data from the AV upon the mobile offload station entering the proximate distance to the AV; and receiving the logged data from the mobile offload station after completion of ingestion of the logged data by the mobile offload station.

16. The non-transitory computer-readable medium of claim 15, wherein the mobile offload station is a further AV.

17. The non-transitory computer-readable medium of claim 15, wherein the mobile offload station is a non-autonomous vehicle.

18. The non-transitory computer-readable medium of claim 15, wherein the operations further comprise determining the data storage threshold based on a level of significance of the logged data.

19. The non-transitory computer-readable medium of claim 15, wherein the operations further comprise deploying the AV to the proximate distance of the mobile offload station upon detecting that the data storage device has exceeded the data storage threshold.

20. The non-transitory computer-readable medium of claim 15, wherein the operations further comprise determining the proximate distance based a rendezvous point chosen such that a cumulative metric of travel times of the AV and the mobile offload station are minimized.

* * * * *